US009841972B2

(12) United States Patent
Young et al.

(10) Patent No.: US 9,841,972 B2
(45) Date of Patent: Dec. 12, 2017

(54) SECURING SECRET INFORMATION IN SOURCE CODE VERIFICATION AND AT RUNTIME

(71) Applicant: Cisco Technology, Inc., San Jose, CA (US)

(72) Inventors: Jason A. Young, Apex, NC (US); Mary Ellen Zurko, Groton, MA (US); Jonathan Mayer Sobel, Cary, NC (US); Carl Bruggeman, Athens, OH (US); Jamie Taylor, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 14/573,405

(22) Filed: Dec. 17, 2014

(65) Prior Publication Data

US 2016/0179660 A1    Jun. 23, 2016

(51) Int. Cl.
G06F 9/44 (2006.01)
G06F 11/36 (2006.01)
G06F 21/54 (2013.01)
G06F 9/445 (2006.01)

(52) U.S. Cl.
CPC .............. *G06F 8/70* (2013.01); *G06F 11/362* (2013.01); *G06F 11/3604* (2013.01); *G06F 11/3624* (2013.01); *G06F 21/54* (2013.01); G06F 9/44589 (2013.01); G06F 11/3668 (2013.01)

(58) Field of Classification Search
CPC .. G06F 11/36–11/3696; G06F 9/445–9/44594; G06F 8/70
See application file for complete search history.

(56) References Cited

U.S. PATENT DOCUMENTS

| 5,794,044 A * | 8/1998 | Yellin ..................... G06F 9/468 712/E9.084 |
| 5,953,526 A * | 9/1999 | Day ......................... G06F 8/73 717/108 |
| 7,996,671 B2 | 8/2011 | Chheda et al. |
| 8,332,823 B2 | 12/2012 | Yamamoto et al. |
| 8,997,065 B2 * | 3/2015 | Karr ..................... G06F 11/3604 712/220 |
| 2004/0031025 A1 * | 2/2004 | Brisset ................ G06F 9/44589 717/154 |
| 2004/0261066 A1 * | 12/2004 | Ringseth ................... G06F 8/43 717/141 |

(Continued)

FOREIGN PATENT DOCUMENTS

WO    03021433 A1    3/2003

OTHER PUBLICATIONS

Huang, Yao-Wen et al., "Securing Web Application Code by Static Analysis and Runtime Protection," 2004, pp. 40-51.*

(Continued)

*Primary Examiner* — Thuy Dao
*Assistant Examiner* — Christopher Franco
(74) *Attorney, Agent, or Firm* — Edell, Shapiro & Finnan, LLC

(57) ABSTRACT

Source code verification, including receiving a declaration of a variable as a secret type, determining if any source code is configured to use the variable as a type other than secret, and if it is determined that there is source code that will use the variable as a type other than secret, creating an exception in the source code verification process.

18 Claims, 8 Drawing Sheets

(56) References Cited

U.S. PATENT DOCUMENTS

| | | | | |
|---|---|---|---|---|
| 2006/0005072 | A1* | 1/2006 | Philippe Conti | G06F 11/28 714/5.11 |
| 2008/0235258 | A1* | 9/2008 | Chung et al. | G06F 17/2211 |
| 2010/0154026 | A1* | 6/2010 | Chatterjee | G06F 21/126 726/1 |
| 2011/0185345 | A1 | 7/2011 | Swamy et al. | |
| 2012/0089860 | A1* | 4/2012 | Zaifman | G06F 11/0709 714/2 |
| 2012/0260344 | A1* | 10/2012 | Maor | G06F 11/3688 726/25 |
| 2012/0311531 | A1* | 12/2012 | Lebert | G06F 8/443 717/108 |
| 2013/0145347 | A1* | 6/2013 | Karr | G06F 11/3604 717/113 |
| 2013/0227521 | A1* | 8/2013 | Bourd | G06F 11/3604 717/110 |
| 2013/0300752 | A1* | 11/2013 | Grover | G06F 9/54 345/520 |
| 2014/0013415 | A1 | 1/2014 | Sabetta et al. | |
| 2014/0143764 | A1* | 5/2014 | Kerschbaum | G06F 8/437 717/143 |
| 2015/0294113 | A1* | 10/2015 | Troeger | G06F 21/53 726/25 |

OTHER PUBLICATIONS

Voas, Jeffrey M. et al., "Software Testability—The New Verification," 1995, pp. 17-28.*

Fournet, Cedric et al., "Modular Code-Based Cryptographic Verification," 2011, pp. 341-350.*

Backes, Michael et al., "Computationally Sound Verification of Source Code," 2010, pp. 387-399.*

Shashidhar, K.C. et al., "Automatic functional verification of memory oriented global source code transformations," 2003, pp. 31-37.*

Knight, John, "Echo: A New Approach to Formal Verification Based on Ada: The Technology & Experience in Security and Medical Devices," 2009, p. 85.*

* cited by examiner

SECURING SECRET INFORMATION IN SOURCE CODE VERIFICATION AND AT RUNTIME

TECHNICAL FIELD

The present disclosure relates to securing secret information in a data processing system.

BACKGROUND

Any individual or organization typically has information that is intended to be secret. Controlling the processing and routing of such information can be problematic, especially in the context of data processing systems. Such systems routinely manipulate, store, and move information, including information that may be considered secret. While mechanisms have been devised for the protection of such information in data processing systems, such mechanisms have historically had shortcomings that have left secret information vulnerable to compromise.

DESCRIPTION OF EXAMPLE EMBODIMENTS

Overview

Figure 1A:
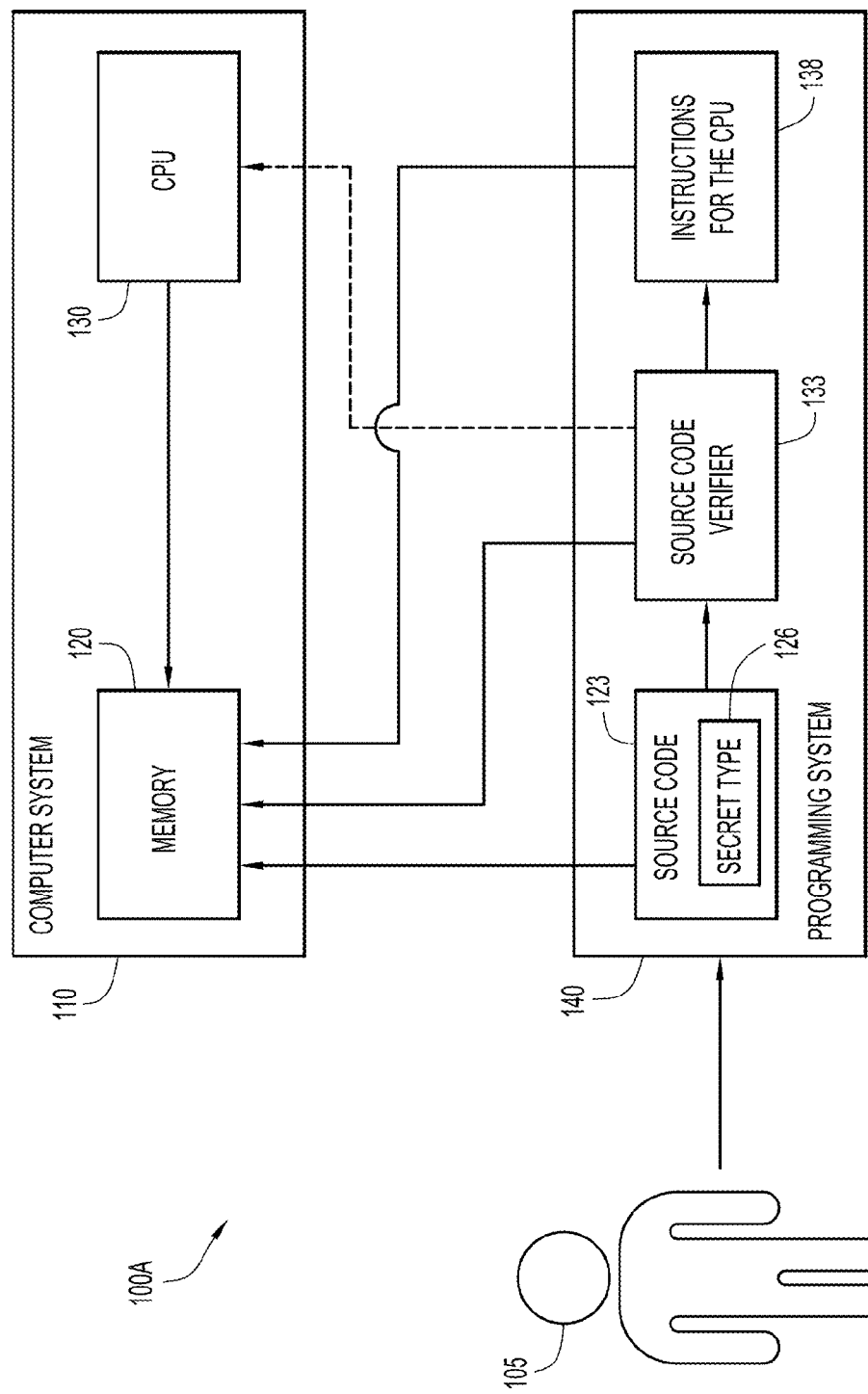
FIGS. 1A and 1B illustrate a computing environment for an example embodiment.

Described herein are techniques for verification of source code. Source code verification may include a variety of operations, including off-line operations such as type-checking, static analysis, or compilation, and on-line operations such as just-in-time compilation and/or interpretation. A declaration of a variable as a secret type is received. It is determined whether any source code is configured to use the variable as a type other than secret. If it is determined that there is source code that will use the variable as a type other than secret, an exception is generated. In an embodiment, this may result in halting the verification process. Other security-related checks may be performed at runtime; again, if issues are detected, an exception is generated.

Example Embodiments

Techniques are presented herein to provide assurance that private cryptographic keying material or other sensitive data cannot be displayed on a console, saved to disk, or sent out of a device, such as a network device. These techniques use system guarantees related to serialization and strong typing to define and restrict types that handle secrets. This removes application and protocol coders as a source of bugs that would leak or mishandle secret data. Serialization, as the term is used herein, refers to the process of taking an internal representation of data and converting it to any of several formats that have an interpretation outside the system, so that the data can be sent outside the system via any of several different mechanisms, such as transmission on a network or saving to a disk. Serialization is a convenient stage at which to check for runtime security violations.

It is desirable to have flexibility in designing software solutions, while also having assurances that sensitive data cannot be leaked outside of the system. Language level type declarations signal to the source code verifier and runtime environment serve to prevent appropriately tagged data from escaping specified boundaries. One implementation is to use a language level restriction to prevent a data record from being serialized, sent on a channel, cast to a different type, and/or saved in memory that is shared across processes. A restriction during source code verification would generate an exception (and prevent source code from compiling, for example) if it attempts to perform any of the above actions.

Presented herein are techniques that allow all of the above for ease of programming, but prevent the memory from being serialized to a physical network device that leaves the system, or used by a function that displays to the console, or writes to disk or other output channel. Memory buffer metadata is updated to contain a "secret" (e.g., not routable) property, denoting that this data is not to be routed externally. A language level form is added to declare that a data record is secret. When a memory buffer is allocated for a data record whose type has been marked as secret (e.g., not routable), this secret (not routable) property is set. When memory with the secret (e.g., not routable) property is copied into a buffer without that property, the secret (e.g., not routable) property shall be set in/on the destination buffer. Any functions or subroutines that display to a screen, write to file, or are otherwise serialized to a network device shall examine the memory metadata and will reject requests that contain the secret (not routable) property. In an embodiment, the serialization will take place, but with a redacted version of the data instead of the actual secret data. These functions can be implemented as a part of the runtime, and restrictions on displaying to screen, writing to file and network device serialization force all usage to go through these functions. It is to be understood that when memory is said herein to have the secret property in its metadata, the memory may have this property by virtue of a pointer to metadata that indicates the secret nature of the data. Moreover, the pointer may reference one or more other pointers that transitively and collectively point to metadata indicating the secret property.

The system and processing described herein serve to restrict transmission of sensitive cryptographic objects, such as keying material, to only the process on which the objects are valid. The type constraint prevents these restricted values from being used within a valid process in any way other than what is specified. This guards against programmer errors that could otherwise accidentally expose sensitive data in log messages, for example. The system and processing described herein use a strongly-typed language with checking of the types during source code verification, and thereby prevent sharing of secrets at the programming level. They protect against accidental propagation of keying material or other sensitive information outside a runtime system by a programmer and, in one embodiment, restrict usage within the system to language defined purposes.

Example embodiments that support the aforementioned features are now described with reference to the accompanying figures.

FIG. 1A illustrates a computing environment 100A in which the techniques described herein may be employed, according to an embodiment. The computing environment 100A includes a computer system 110 that includes memory 120 and a central processing unit (CPU) 130.

A programming system 140 is used by a developer 105 to create software in the illustrated embodiment. In the software development process, the developer 105 creates source code 123. The source code 123 includes the use of a secret variable type 126. Such a type may be created in source code 123, or may be a pre-existing feature of the programming language. Any data that is typed as secret will be treated in a secure manner, as will be described in greater detail below. Such data may be a cryptographic key, a password, an authentication value, personal or proprietary information, and/or other sensitive data that needs to be kept secret from unauthorized parties, devices, or channels. Programming system 140 also includes a source code verifier 133. Source code verification may include any of a variety of processes performed on source code 123, including off-line processes (such type-checking, static analysis, pre-compilation or compilation) and on-line operation (such as just-in-time compilation or interpretation). Any of these processes may examine the source code, prior to execution, for potential mishandling of secret typed data. This serves to control the processing of sensitive data, such as secret typed data, by raising an exception and/or ceasing operation if the resulting executable code will potentially mishandle such data. In the illustrated embodiment, the source code verifier 133 outputs executable code, shown as instructions 138.

In an embodiment, some or all of the programming system 140 may be resident on computer system 110. Source code 123 may be stored in memory 120 of computer system 110. The source code verifier 133 may itself be implemented in software, and may be stored in memory 120 and executed by CPU 130. The instructions 138 may also be stored in memory 120.

Figure 1B:
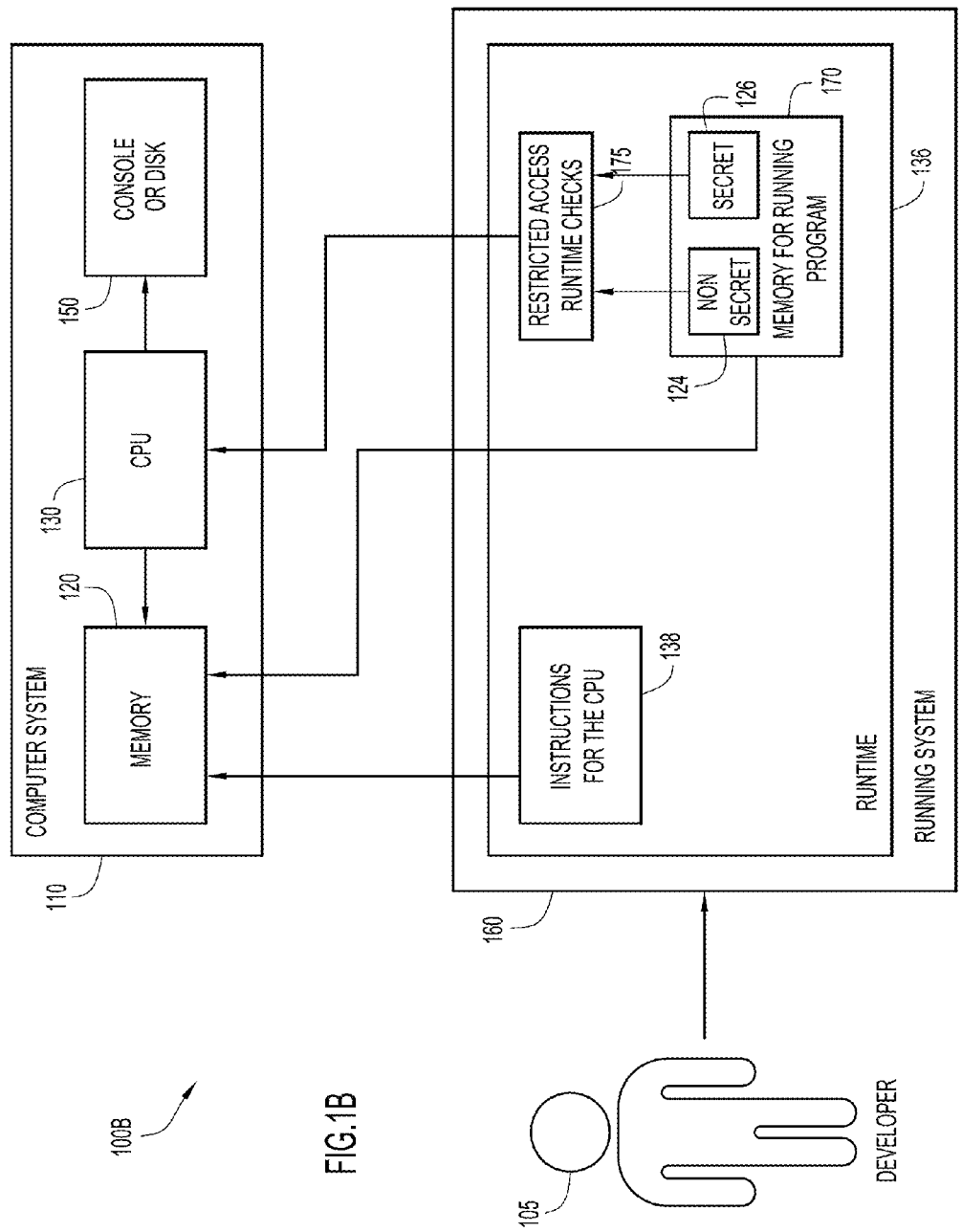

If the software proceeds to the execution stage, the execution may take place in a runtime environment such as running system 160 shown in FIG. 1B. Running system 160 includes runtime environment 136, which in turn includes memory 170 for the running program represented by instructions 138. The running program includes data that is typed as secret (126), as well as data of other, non-secret types (124). At runtime, runtime checks 175 control the processing and communication of secret-typed data. An unauthorized attempt at serialization and output generates an exception, as will be described in greater detail below. In an embodiment, this may lead to halting of the running program.

In the illustrated embodiment, the system 160 runs on computer system 110. In this case, the instructions 138 are stored in memory 120 of computer system 110 and the memory 170 for the running system is part of memory 120. The runtime checks 175 may be implemented in software, in which case the checks 175 are executed on CPU 130. During execution, the runtime checks 175 control the serialization of secret typed data 126 to output devices 150. Such devices 150 may include a console or disk for example and without limitation.

In an embodiment, the computer system 110 of FIGS. 1A and 1B may be a dedicated software development system. Alternatively, this computer system 110 may be a general purpose computer system. Moreover, the computing system 110 may be of any size and speed known to persons of ordinary skill in the art. The system may be anything from a personal computing platform to a mainframe system.

While FIGS. 1A and 1B illustrate a single computer system that performs both source code verification and runtime processing, in alternative embodiments, the source code verification and runtime processes may take place on separate computing systems, as would be understood by a person of ordinary skill in the art.

A flowchart for a process 200 is now described with reference to FIG. 2, according to an embodiment. At 210, during a source code verification process (e.g., operation of a compiler), a determination is made as to whether a sequence of code (e.g., a function or other subroutine) will serialize, for output, a variable that has been typed as secret, or will cast the variable to an object of some other type. If either condition is met, then a source code verification error occurs at 220. The source code that is configured to use the variable as a type other than secret may comprise a function or subroutine that receives the variable as a parameter.

Otherwise, the process continues at 230. Here, during runtime, a determination is made as to whether the now-executing code (such as a function or subroutine) will serialize and output a variable typed as secret, e.g., write or display the secret to a console or write it to a disk or other device or interface. If so, a run time error or exception arises at 240. Otherwise, at 250, a determination is made as to whether a record or other data structure containing such a variable will be output. If so, a run time error or exception results at 240. If none of the above conditions are met, then source code verification and execution proceed as usual at 260.

In another embodiment, serialization and output of a secret variable is allowed to proceed only after a redaction process. Only the redacted (non-secret) version of the data, with any secret data removed, is serialized, thereby preventing the output of secret information. This is shown at 240. This can be useful when the functionality of a process is being monitored or logged. The process can execute normally, in that the serialization is allowed to take place in a normal fashion. In this manner the pertinent runtime information can be collected. The secret information, however, is not ultimately written to the medium and does not appear in the log.

Figure 2:
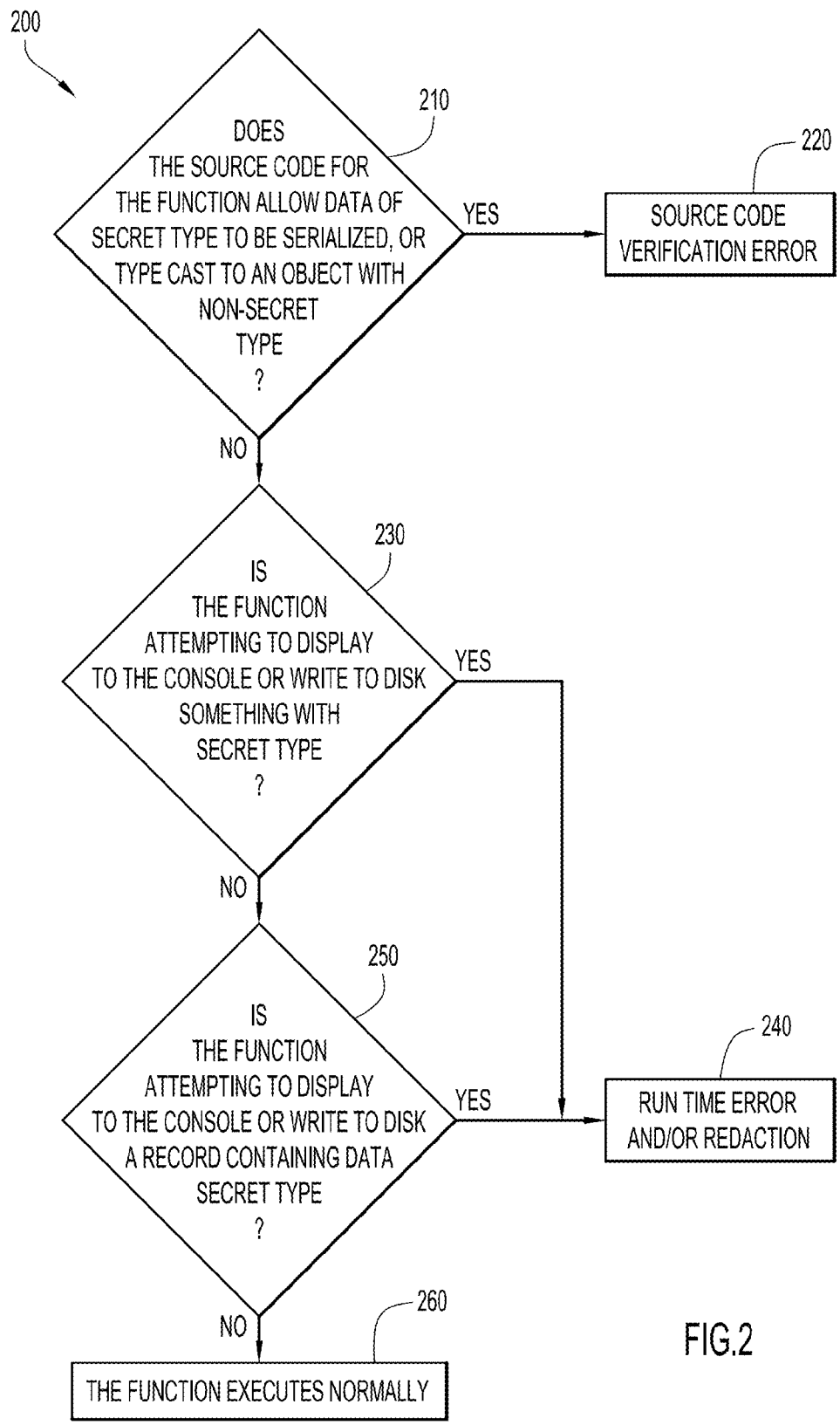
FIG. 2 is a high-level flowchart of a process, according to an example embodiment.
Figure 3:
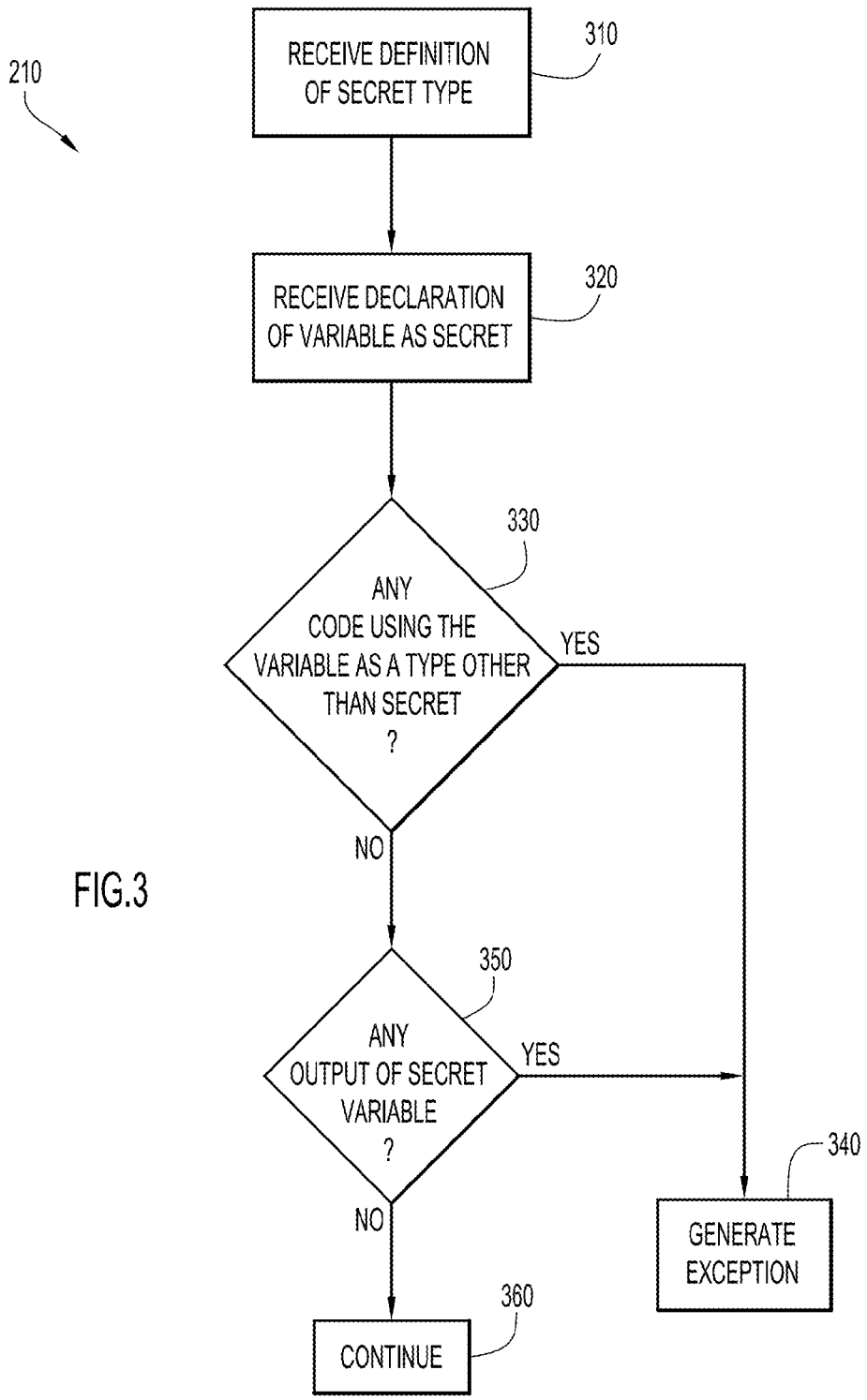
FIG. 3 is a flowchart depicting operation of a compiler, according to an example embodiment.

Operation of the source code verification process (210 of FIG. 2) performed by a source code verifier (e.g., source code verifier 133 of FIG. 1A) is illustrated in FIG. 3, according to an embodiment. At 310, the source code verifier obtains a definition of a secret variable type. In an alternative embodiment, the language being used has such a type predefined, in which case the source code verifier may not require such a definition during the source code verification process. At 320, a type declaration for the variable is received, where the variable is declared as being of the secret type. At 330, a determination is made as to whether there is any code that will use, or cast, the variable as a type other than secret. If so, then at 340 the source code verification generates an exception. In an embodiment, the source code verification halts as a result of the exception handling. At 350, a determination is made as to whether the code includes any output, or serialization, of the secret variable. If so, then the source code verification generates an exception at 340; again, this may result in halting of the verification process. In an alternative embodiment, this could result in the substituting a redacting form of the serialization subroutine (e.g., by generating different instructions if the source code verifier is a compiler). In any case, a prospective process that might compromise secret information is prevented from reaching the executable stage.

While the embodiments of FIGS. 2 and 3 may involve operation of a compiler, in an alternative embodiment, the processing described above may take place in a separate pre-compilation process. Such a pre-compilation process may not, by itself, generate executable code, but would instead process source code to facilitate data typing and resolution of prospective execution issues.

Figure 4:
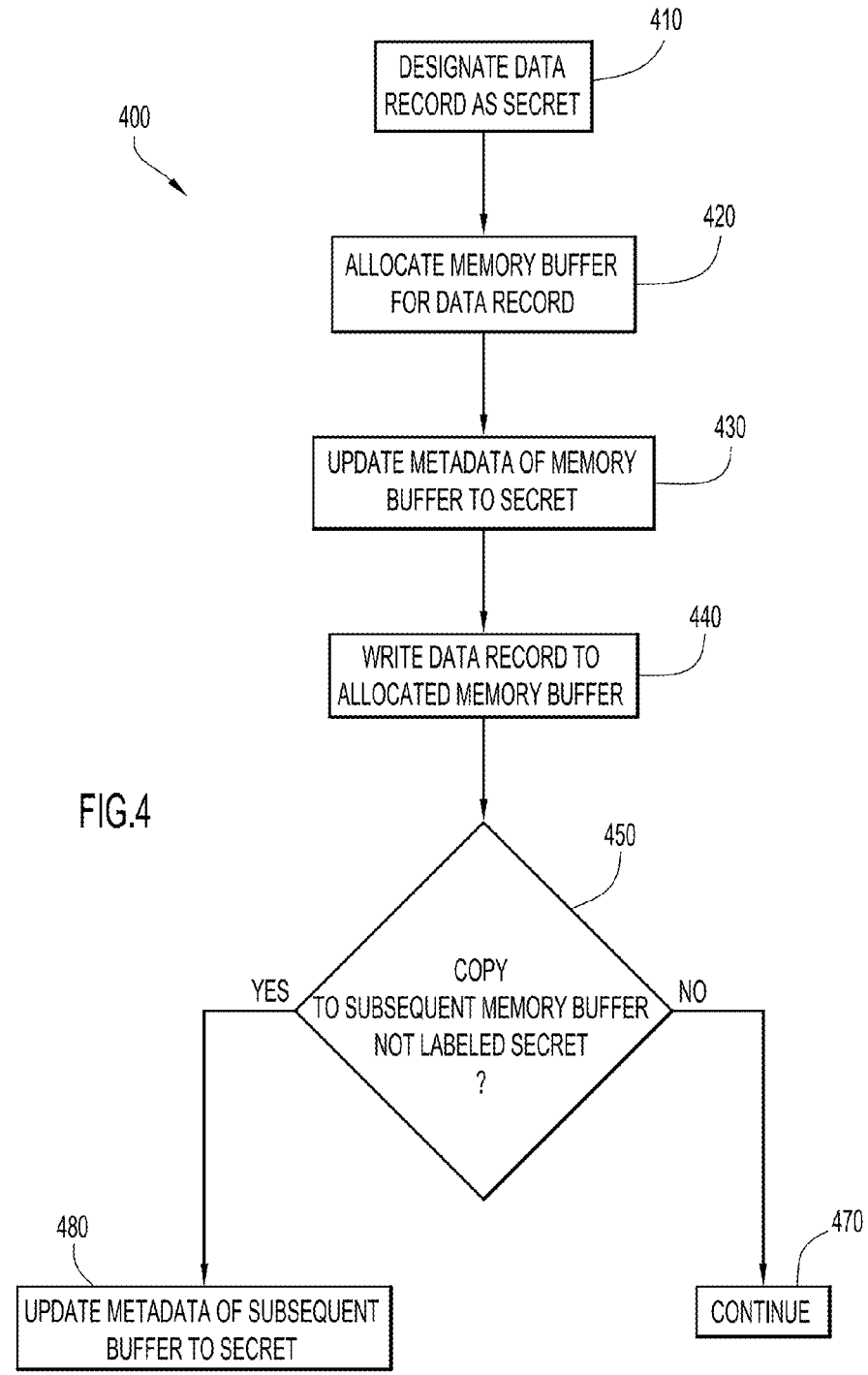
FIG. 4 is a flowchart depicting operations for execution of a compiled program in a runtime environment, according to an example embodiment.

At runtime, the metadata associated with the secret is used and compared to the metadata of prospective memory locations, including memory buffers. This is illustrated in the process 400 of FIG. 4, according to an embodiment. At 410, a data record containing the secret information is designated as secret. This designation may be specified in metadata associated with the data record. At 420, memory (e.g., a first memory buffer) for this data record is allocated. At 430, metadata for the memory is updated to show that its contents will be secret. At 440, the data record is written to the allocated memory. As noted above, the secret information may be a cryptographic key, a password, an authentication value, personal or proprietary information, and/or other sensitive data.

At 450 a determination is made as to whether the contents of this memory location are to be copied to subsequent memory buffer not indicated as secret, i.e., a subsequent memory buffer whose metadata does not identify the buffer as secret or does not point to such an indication. If this is the case, then at 480, then the metadata of the subsequent memory buffer is updated to label this buffer as secret or to point to such a label or indication. Otherwise, the process continues at 470. This process serves to assure that secret information and the memory location that stores it have the appropriate metadata. Such metadata allows appropriate controls to be applied during runtime.

Figure 5:
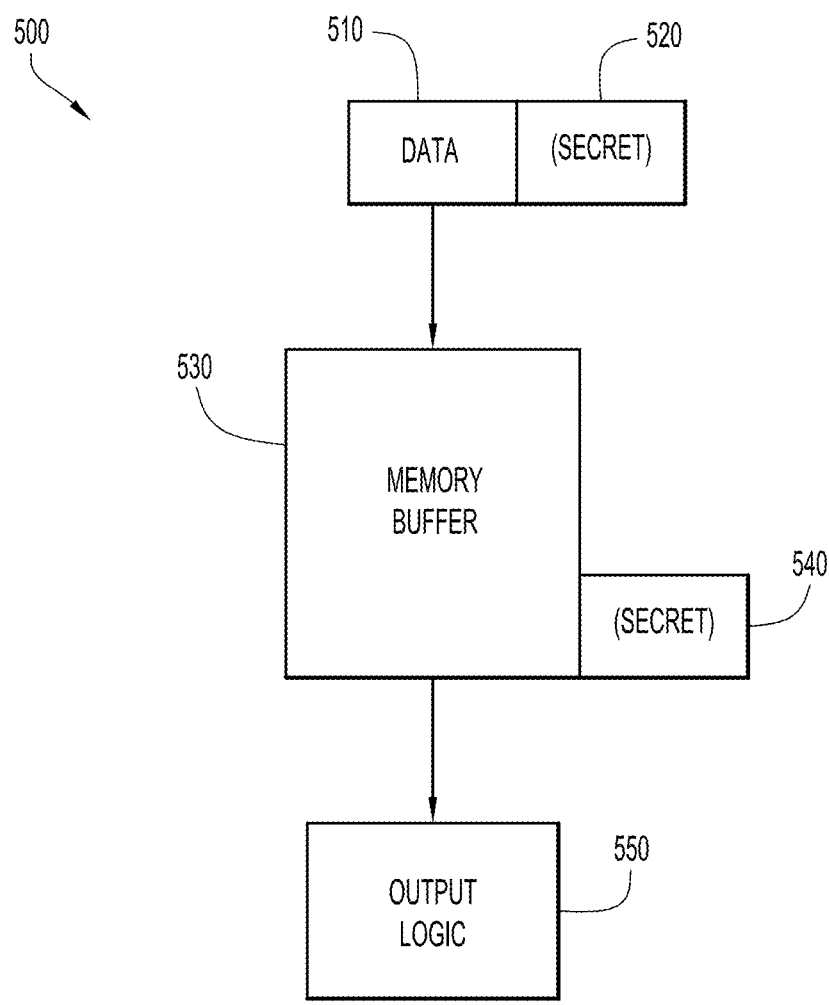
FIG. 5 is a diagram graphically depicting execution of a compiled program in a runtime environment, according to an example embodiment.

FIG. 5 illustrates the process 400 in graphical form. A data record 510 is shown, having metadata 520. As shown in FIG. 5, the metadata 520 shows or indicates that the data record contains secret information. The data record 510 may be written to an allocated memory buffer 530. Metadata 540 for the memory buffer 530 is updated to reflect the fact that the contents of memory buffer 530 are secret. The secret contents of the memory buffer 530 may then be used by subsequent logic. In the illustrated example, the subsequent logic may include output logic 550.

Figure 6:
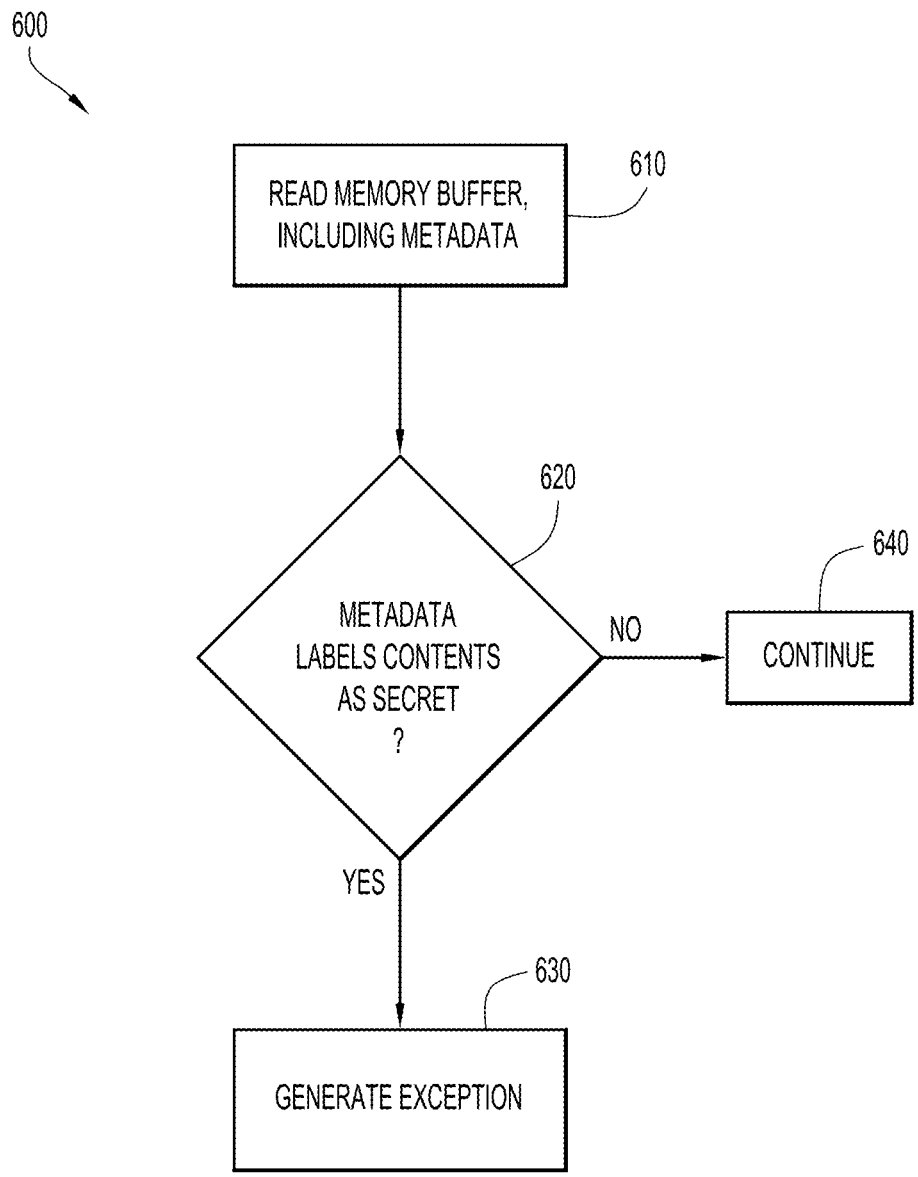
FIG. 6 is a flowchart depicting operations for halting output of secret information during execution of a program in a runtime environment, according to an example embodiment.
Figure 7:
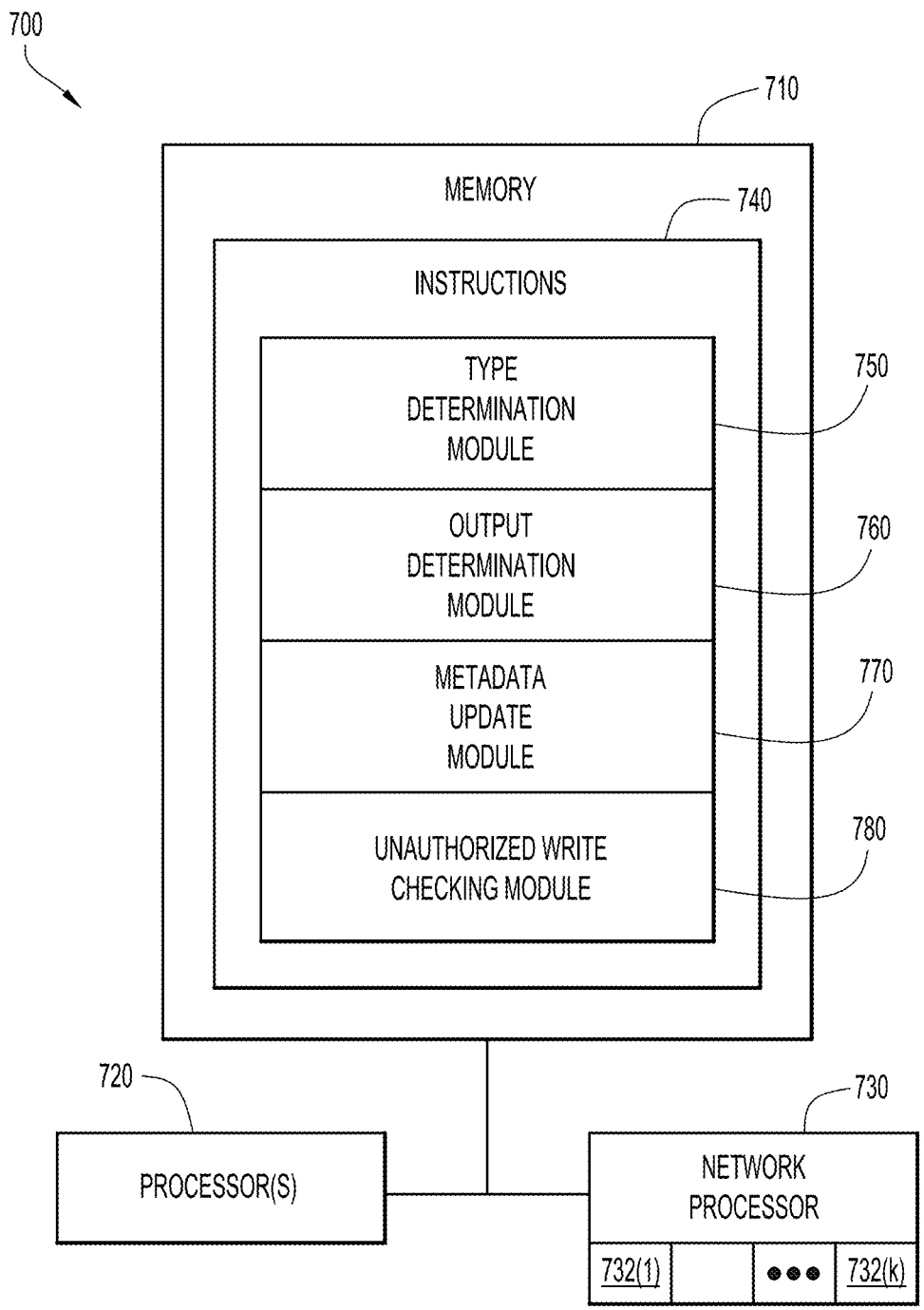
FIG. 7 is a block diagram of a device configured to perform the techniques described herein, according to an example embodiment.

A process 600 for monitoring output logic at runtime is shown in FIG. 6, according to an embodiment. At 610, the contents of the memory, including the metadata, is read. At 620, a determination is made as to whether the metadata of the memory location shows that its contents are secret. If so, then an exception is generated at 630, and the output, or writing, is stopped. Otherwise the process may be allowed to continue at 640. The process of FIG. 6 averts the output of secret data to an unauthorized device or channel. Unauthorized devices may include a display, console, a volatile memory device, a non-volatile memory device such as a disk, or a communications interface, such as a network interface or port. In an embodiment, the above processing by the intermediate device is performed in accordance with software or firmware executing on one or more processors. A software or firmware embodiment is illustrated in FIG. 7. Device 700 may be a network device that includes one or more memory devices, shown collectively as memory 710. Memory 710 is in communication with one or more processors 720 and with one or more input/output (I/O) devices and/or interfaces. In an embodiment, the I/O may comprise a network processor unit 730 that has associated network ports 732(1)-732(K). The network processor unit 730 and ports 732(1)-732(K) enable communication with a first and second computing device, e.g., a client and server. The network processor unit 730 may include one or more Application Specific Integrated Circuits (ASICs) that are configured with digital logic gates to perform various networking and security functions (routing, forwarding, deep packet inspection, etc.).

Memory 710 may comprise read only memory (ROM), random access memory (RAM), magnetic disk storage media devices, optical storage media devices, flash memory devices, electrical, optical, or other physically tangible (i.e., non-transitory) memory storage devices. Memory 710 stores data as well as executable instructions 740. Instructions 740 are executable on processor(s) 720. The processor(s) 720 comprise, for example, a processor, microprocessor, or microcontroller that executes instructions 740. Thus, in general, the memory 710 may comprise one or more tangible (non-transitory) computer readable storage media (e.g., memory device(s)) encoded with software or firmware that comprises computer executable instructions. When the instructions are executed (by the processor(s) 720) the software or firmware is operable to perform the operations described herein.

In the illustrated embodiment, the executable instructions 740 may include several modules. These include a type determination module 750 for the determination of a variable's type and preventing the casting of a secret variable as a non-secret value. As discussed above, the type may be determined by receiving and processing a declaration in a source program that is being compiled. An output determination module 760 may also be present, to detect unauthorized output operations in the source code. In an embodiment, the modules 750 and 760 may be part of a compiler. As discussed above, in an alternative embodiment the processing described for modules 750 and 760 above may instead take place in a separate pre-compilation process.

Instructions 740 may also include a metadata update module 770, for updating the metadata of a memory location (such as a memory buffer) when writing a secret value to the location during runtime. Instructions 740 may also include an unauthorized write checking module 780 to detect attempts to write secret data to an output device, such as a console, disk, or communications interface. In an embodiment, modules 770 and 780 may be incorporated in the logic of a runtime environment.

One embodiment of the techniques presented herein provides assurance that private cryptographic keying material or other sensitive data cannot be displayed on a console, saved to disk, or sent out of a device, such as a network device. These techniques use system guarantees related to serialization and strong typing to define and restrict types that handle secrets. This removes application and protocol coders as a source of bugs that would leak or mishandle secret data.

Component level abstractions and isolation can be used to prevent unintentional leakage from memory used to store cryptographic keying material or other sensitive data. This isolation can be less error prone and create lower overhead from a software design perspective with special purpose language decoration.

While the methods and computing systems described above address the problem of controlling secret information, it is to be understood that these methods and systems may also be used in embodiments where there is more than one degree of secrecy. Some information processing environments may have, for example, top secret information, secret information, confidential information, and unclassified information, in order of decreasing sensitivity. In such an environment, the system described above would prohibit casting of a variable or data structure typed at one sensitivity level to a variable typed at a less sensitive level. In addition, output options (e.g., output devices or interfaces) would be labeled according to the level of information that they can receive. The system described above would prevent the output of information at one level to an output channel or device labeled at a lower (i.e., less sensitive) level. The system would therefore treat such an output channel or device as unauthorized for such an output operation. Conversely, sensitive data would be permitted on an output channel or device if that channel and device were considered trusted to the appropriate degree.

In one form, presented herein is a method comprising, at a computing device executing a source code verification process, receiving a declaration of a variable as a secret type; determining if any source code is configured to use the variable as a type other than secret; and if it is determined that there is source code that will use the variable as a type other than secret, generating a first exception to the source code verification process. If it is determined that the source code contains any operation that outputs the variable to an unauthorized device, a second exception is generated in the source code verification process. During runtime, if the metadata of a memory buffer labels the memory buffer as secret, a third exception is generated if an attempt is made to write the data from the buffer to an unauthorized device.

In another form, an apparatus is provided comprising one or more processors; and one or more memory devices in communication with the one or more processors and storing executable instructions that, when executed by the one or more processors, cause the one or more processors to, in a source code verification process, receive a declaration of a variable as a secret type; determine if any source code is configured to use the variable as a type other than secret; and if it is determined that there is source code that will use the variable as a type other than secret, generate a first exception in the source code verification process. Further instructions may cause the processor(s) to determine if the source code contains any operation that outputs the variable to an unauthorized device; if so, a second exception is generated in the source code verification process. During runtime, if the metadata of a memory buffer labels the memory buffer as secret, additional instructions cause the processor(s) to generate a third exception if an attempt is made to write the data from the buffer to an unauthorized device.

In another form, one or more computer readable non-transitory storage media are described, encoded with software comprising computer executable instructions that when executed by one or more processors, cause the one or more processors to, in a source code verification process, receive a declaration of a variable as a secret type; determine if any source code is configured to use the variable as a type other than secret; and if it is determined that there is source code that will use the variable as a type other than secret, generate a first exception to the source code verification process. If it is determined that the source code contains any operation that outputs the variable to an unauthorized device, further instructions generate a second exception in the source code verification process. During runtime, if the metadata of a memory buffer labels the memory buffer as secret, further instructions generate a third exception if an attempt is made to write the data to an unauthorized device.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Functional building blocks are used herein to illustrate the functions, features, and relationships thereof. At least some of the boundaries of these functional building blocks have been arbitrarily defined herein for the convenience of the description. Alternate boundaries may be defined so long as the specified functions and relationships thereof are appropriately performed. The breadth and scope of the claims should not be limited by any of the example embodiments disclosed herein.

What is claimed is:

1. A method comprising:
at a computing device executing a source code verification process:
receiving a language level declaration of a variable as a secret type;
compiling source code;
while compiling the source code, determining whether the source code is configured to serialize the variable for output to an unauthorized device or declare the variable as a type other than secret;
if it is determined that the source code is configured to serialize the variable for output or declare the variable as a type other than secret, generating a first exception in the source code verification process to stop the compiling of the source code;
designating a data record as secret;
creating metadata for the data record, wherein the metadata for the data record labels the data record as secret;
allocating a first memory buffer for the data record;
updating metadata for the first memory buffer to label the first memory buffer as secret; and
if, while executing the source code, the data record is copied from the first memory buffer to a second memory buffer whose metadata labels the second memory buffer as other than secret, updating metadata for the second memory buffer to label the second memory buffer as secret.

2. The method of claim 1, further comprising:
receiving a definition of the secret type.

3. The method of claim 1, further comprising:
if the compiling of the source code successfully completed, executing the source code;
while executing the source code, determining whether the source code contains any operation that will output the variable or a data record including the variable to an unauthorized device; and
if it is determined that the source code contains any operation that outputs the variable or a data record including the variable to an unauthorized device, generating a second exception in the source code verification process to stop the execution of the source code.

4. The method of claim 1, wherein the source code comprises a function or subroutine that receives the variable as a parameter.

5. The method of claim 1, further comprising, while executing the source code:
attempting to write the data record to an unauthorized device;
reading the metadata of the first memory buffer; and
if the metadata of the first memory buffer labels the memory buffer as secret, generating a third exception to stop the execution of the source code.

6. The method of claim 1, further comprising, while executing the source code:
attempting to write the data record to an unauthorized device;
reading the metadata of the first memory buffer; and
if the metadata of the first memory buffer labels the memory buffer as secret, redacting the data record by removing secret information before writing the data record to the unauthorized device.

7. An apparatus comprising:
one or more processors; and
one or more memory devices in communication with the one or more processors and storing executable instructions that, when executed by the one or more processors, cause the one or more processors to:
in a source code verification process, receive a language level declaration of a variable as a secret type;
compile source code;
while compiling the source code, determining whether the source code is configured to serialize the variable for output to an unauthorized device or declare the variable as a type other than secret;
determine if any source code is configured to use the variable as a type other than secret;
if it is determined that the source code is configured to serialize the variable for output or declare the variable as a type other than secret, generate a first exception in the source code verification process to stop compiling of the source code;
designate a data record as secret;
create metadata for the data record, wherein the metadata for the data record labels the data record as secret;
allocate a first memory buffer for the data record;
update metadata for the first memory buffer to label the first memory buffer as secret; and
if, while executing the source code, the one or more processors attempt to copy the data record from the first memory buffer to a second memory buffer whose metadata labels the second memory buffer as other than secret, update metadata for the second memory buffer to label the second memory buffer as secret.

8. The apparatus of claim 7, wherein the instructions further cause the one or more processors to:
receive a definition of the secret type.

9. The apparatus of claim 7, wherein the instructions further cause the one or more processors to:
if compiling of the source code successfully completed, execute the source code;
while executing the source code, determine whether the source code contains any operation that will output the variable or a data record including the variable to an unauthorized device; and
if it is determined that the source code contains any operation that outputs the variable or a data record including the variable to an unauthorized device, generate a second exception in the source code verification process to stop the execution of the source code.

10. The apparatus of claim 7, wherein the source code that is configured to use the variable as a type other than secret comprises a function or subroutine that receives the variable as a parameter.

11. The apparatus of claim 7, wherein the instructions further cause the one or more processors to:
if the one or more processors attempt to write the data record to an unauthorized device, read the metadata of the first memory buffer; and
if the metadata of the first memory buffer labels the memory buffer as secret, generate a third exception.

12. The apparatus of claim 7, wherein the instructions further cause the one or more processors to:
if, while executing the source code, the one or more processors attempt to write the data record to an unauthorized device, read the metadata of the first memory buffer; and
if the metadata of the first memory buffer labels the memory buffer as secret, redact the data record by removing secret information before writing the data record to the unauthorized device.

13. One or more computer readable non-transitory storage media encoded with software comprising computer executable instructions that when executed by one or more processors, cause the one or more processors to:
in a source code verification process, receive a language level declaration of a variable as a secret type;
compile source code;
while compiling the source code, determine whether the source code is configured to serialize the variable for output to an unauthorized device or declare the variable as a type other than secret;
if it is determined that the source code is configured to serialize the variable for output or declare the variable as a type other than secret, generate a first exception in the source code verification process to stop the compiling of the source code;
designate a data record as secret;
create metadata for the data record, wherein the metadata for the data record labels the data record as secret;
allocate a first memory buffer for the data record;
update metadata for the first memory buffer to label the first memory buffer as secret; and
if, while executing the source code, the one or more processors attempt to copy the data record from the first memory buffer to a second memory buffer whose metadata labels the second memory buffer as other than secret, update metadata for the second memory buffer to label the second memory buffer as secret.

14. The computer readable media of claim 13, wherein the instructions further cause the one or more processors to:
receive a definition of the secret type.

15. The computer readable media of claim 13, wherein the instructions further cause the one or more processors to:
if compiling of the source code successfully completed, execute the source code;
while executing the source code, determine whether the source code contains any operation that will output the variable or a data record including the variable to an unauthorized device; and
if it is determined that the source code contains any operation that outputs the variable or a data record including the variable to an unauthorized device, generate a second exception in the source code verification process to stop the execution of the source code.

16. The computer readable media of claim 13, wherein the source code that is configured to use the variable as a type other than secret comprises a function or subroutine that receives the variable as a parameter.

17. The computer readable media of claim 13, wherein the instructions further cause the one or more processors to:

if, while executing the source code, the one or more processors attempt to write the data record to an unauthorized device, read the metadata of the first memory buffer; and if the metadata of the first memory buffer labels the first memory buffer as secret, generate a third exception.

18. The computer readable media of claim 13, wherein the instructions further cause the one or more processors to:

if, while executing the source code, the one or more processors attempt to write the data record to an unauthorized device, read the metadata of the first memory buffer; and if the metadata of the first memory buffer labels the first memory buffer as secret, redact the data record by removing secret information before writing the data record to the unauthorized device.

* * * * *